F. H. PIERPONT.
CUTTER SHAPING MACHINE.
APPLICATION FILED OCT. 1, 1906.

989,636.

Patented Apr. 18, 1911.
11 SHEETS—SHEET 3.

F. H. PIERPONT.
CUTTER SHAPING MACHINE.
APPLICATION FILED OCT. 1, 1906.

989,636.

Patented Apr. 18, 1911.
11 SHEETS—SHEET 4.

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

CUTTER-SHAPING MACHINE.

989,636.        Specification of Letters Patent.     Patented Apr. 18, 1911.

Application filed October 1, 1906. Serial No. 336,989.

*To all whom it may concern:*

Be it known that I, FRANK HINMAN PIERPONT, a citizen of the United States, temporarily residing at Horley, in the county of Surrey, England, have invented a certain new and useful Improvement in Cutter-Shaping Machines; and I do hereby declare the following to be a full, clear, and exact description of the same, reference being had to the accompanying drawings, forming a part of this specification, and to the figures and letters of reference marked thereon.

This invention relates to the art of engraving or die cutting as applied to the production of the punches used in driving matrices for type machines, such as the monotype and similar machines, and it has to do specifically with the cutter and the means for producing the same in a manner to secure accuracy and precision in the form, relation and proportion of the cutting edges or faces, whereby not only are the operations incident to the cutting of the punch greatly simplified and rendered easier of execution by the unskilled operator, but the quality of the product and its close approximation in form and detail to the master pattern are assured to a greater degree than by any known method at present in use.

The actual cutting of the punch is performed by a special engraving or punch cutting machine provided with a blank holder and a rotating cutting tool relatively movable in two directions, the one parallel with the axis of the cutter, and the other perpendicular thereto. The movement transverse of the axis of the cutter is effected and controlled through the medium of a pantographic system equipped with a tracer, which is caused to follow the outline of a fixed master pattern, the latter an exact copy on an enlarged scale of the type face to be cut.

In order that the punch may be equipped to resist the great pressure required in effecting the drive, and to facilitate the withdrawal of the type from the matrix, the side walls of the character are formed at an incline converging toward and merging into the face, which latter is a reproduction, on a reduced scale, of the master pattern. The angles occurring in the face are not all reproduced in the body, but gradually merge into the curved or inclined side walls. This result is secured by a relative adjustment of the blank and cutter in a direction parallel with the axis of the latter and by causing the tracer in its movement about the pattern to more or less approximate, without exactly following, the outline of the pattern. Obviously, in such a system the form of the punch is dependent partly upon the cutter and partly upon the relative motions of the latter and the blank, and unless an exact correlation is established and maintained between said elements it is impossible to predetermine the exact adjustments necessary to produce the desired results; in other words, it is essential that the cutting edges of the cutter should be of known or standard form and dimensions, each part bearing a known relation to the controlling or adjusting agents, in order that the effect of the latter may be precalculated to the end that at each stage of adjustment or movement the resultant may be determined with certainty and precision. Much depends upon the adjusting devices, but unless the cutter is properly shaped and of known and exact dimensions, it is impossible to determine in advance the exact form of the punch, hence it results that frequent observations of the work followed by readjustments of the control devices, to compensate for irregularities or departures from the standard, become necessary involving the exercise of the highest degree of skilled labor and the consumption of must time.

Now the object of the present invention is to provide a means whereby cutters of known forms and dimensions, suited for the work to be performed, can be expeditiously and accurately fashioned, and said invention is embodied in a machine provided with a lap or other grinding device, a cutter-carrier that holds the tool in grinding relation to the lap and a microscope having in it a gage (constituted by, for example, two parallel lines and a cross line) in order that the cutter in the carrier may be ground to the microscope gage. The cutter-carrier support and microscope are relatively movable under such mechanical constraint (say by one member of a Cardan joint) that the position of that part of the path of the movable element that brings the cutter within the microscope field and the relation of the cutter to that path are predetermined and invariable. A stop is also preferably provided whereby the gaging position of the cutter, xcept for metal removed by grinding, is accurately predetermined and invariable in order that without disturbance of the cutter in the carrier or support, the particular portion of the cutter-surface the gage is to test, shall be brought into testing relationship by the simple operation of bringing the support to the stop.

According to the preferred form of construction of machine for carrying out this invention the cutter-carrying head is supported from the frame by a Cardan joint (one formed or provided with two pivotal axes at right angles) and a templet or guide engages the head and controls and limits its movement about the joint so that the cutter can be moved in the precise relationship to the grinding device which is necessary for obtaning the required shape.

A further feature of this invention consists in illuminating the cutter while under the microscope by projecting light along the optical axis of the microscope through the object-glass on to the cutter and also simultaneously from behind the cutter toward the object-glass.

The cutter produced by this machine and found to be the best adapted for the work for which it is intended is in the form of a pointed angular pyramid whereon the intersection of adjacent faces affords an edge which is first a curve from the point along a convex tip, then a straight incline at a given angle with the axis, next a second curve that is the produced first curve, and finally a tangent to the second curve slanting outward to the base at an angle to the axis less than said given angle.

In the accompanying drawings which illustrate the preferred form of embodiment of cutter-grinding machine constructed according to this invention: Fig. 15 is a plan of an attachment for the machine.

Like letters indicate like parts throughout the drawings.

Figure 3:
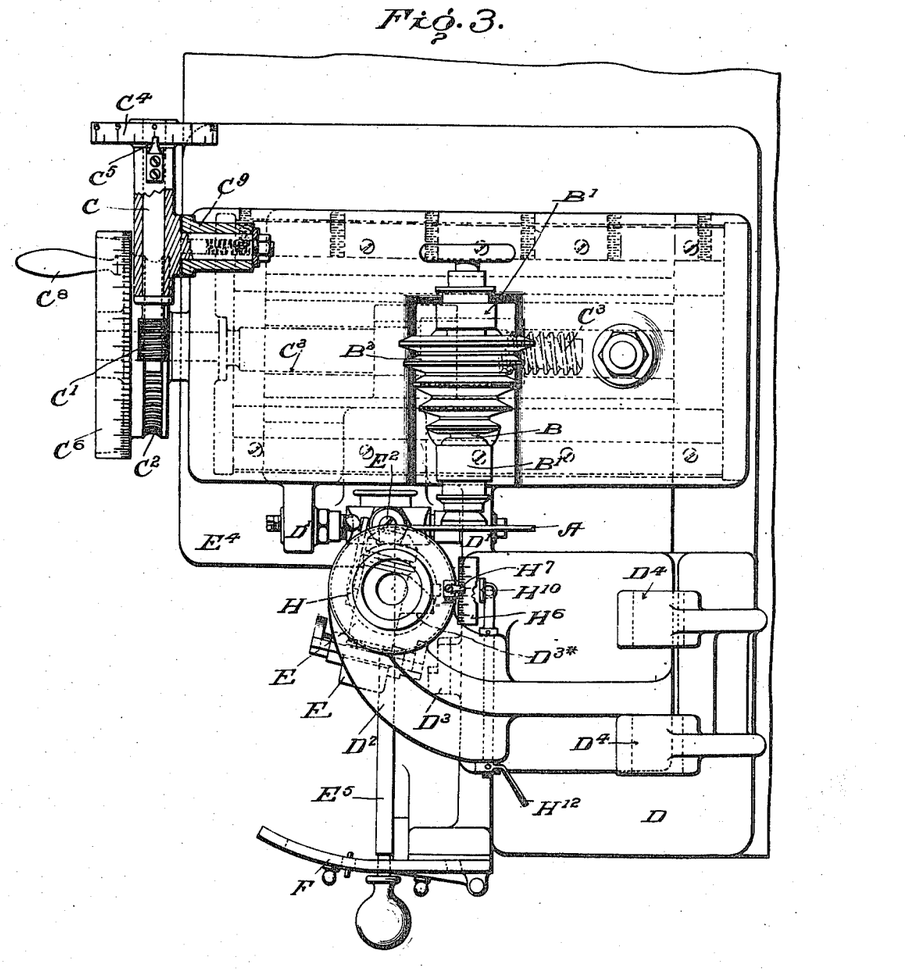
Fig. 3 is a plan of Fig. 2.

The lap or grinding disk A is carried by a mandrel B mounted in a head $B^1$. The mandrel carries a pulley $B^2$ to receive a belt whereby it may be rotated from any convenient drawing member. The head is adjustable upon its support in a direction transverse to the longitudinal axis of the mandrel. This adjustment is effected by a spindle C having a worm $C^1$ which engages a worm wheel $C^2$ (Fig. 3). The worm wheel $C^2$ is carried by a screw-threaded spindle $C^3$ which engages a correspondingly threaded lug on the underside of the head. The head is carried on guides in its support, and the spindle $C^3$ is held against endwise movement so that the required adjustment is obtained without displacement of the head in the direction of the longitudinal axis of the mandrel, as will be readily understood. The spindle C carries an index wheel $C^4$ and a stationary index $C^5$ is secured to the support of the spindle whereby the degree of adjustment of the head may be accurately ascertained. The spindle $C^3$ also carries an index wheel $C^6$ whereby the degree of rotation imparted to it may be read against an index $C^7$ on a stationary part of the machine. The index wheel $C^6$ carries a handle $C^8$ whereby it may be rotated independently of the spindle C when it is desired to move the head $B^1$ rapidly in one direction or the other. For this purpose the spindle C is carried by a pivot in a lug $C^9$ (Fig. 3) so that it may be rocked into such a position that the worm $C^1$ is lifted out of engagement with the worm wheel $C^2$. Any convenient means may be provided for retaining the worm in its engaged or disengaged position.

Figure 9:
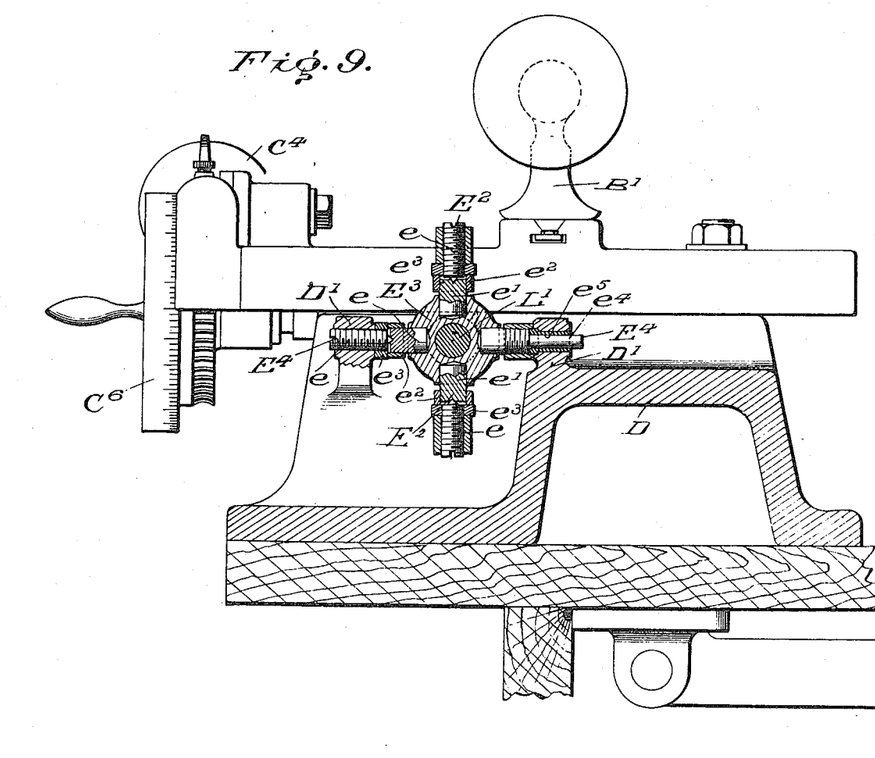
Fig. 9 is a detail view of the joint whereby the cutter carrying head is supported.
Figures 10, 11, 12, 14:
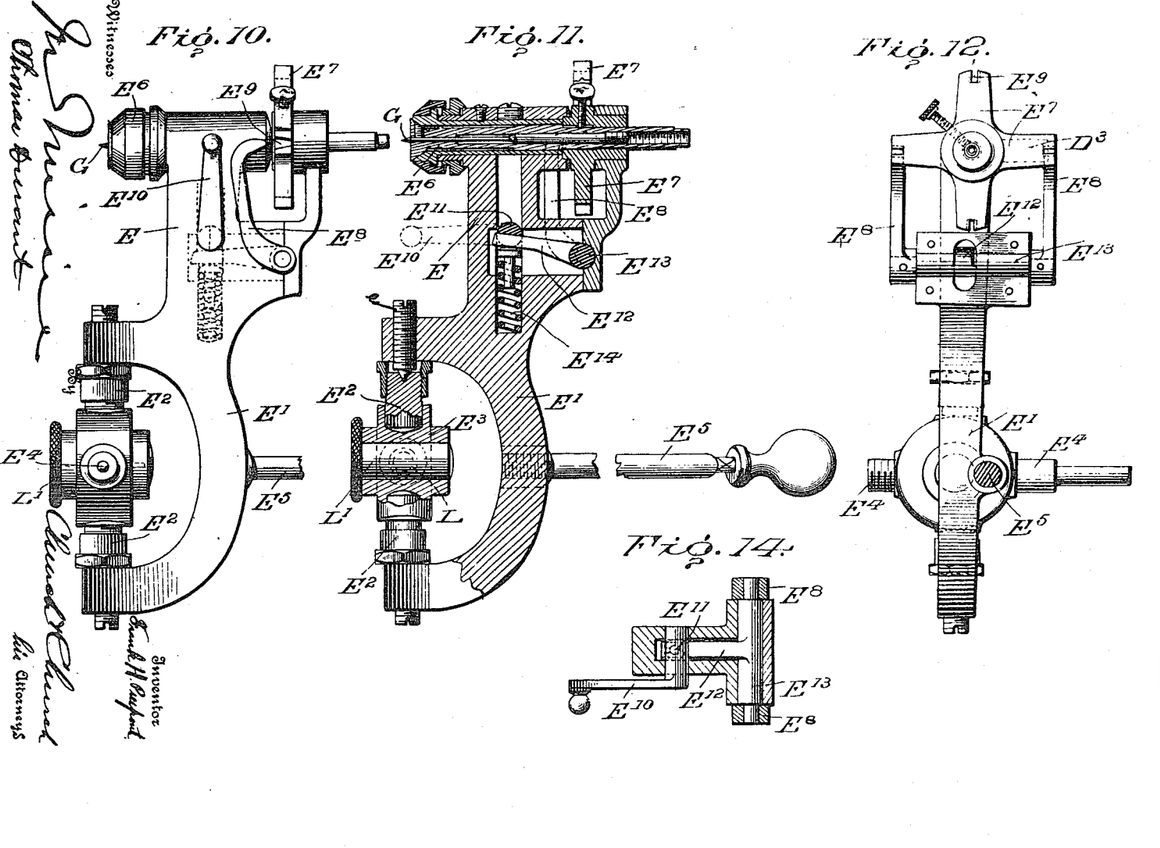
Fig. 10 is a side elevation of the cutter-carrying head and supporting joint.
Fig. 11 is a central vertical section of the same.
Fig. 12 is a rear elevation of the same.
Figs. 13 and 14 are details of the head.

The tool carrying head E is arranged to oscillate in transverse planes and at various angles, to which end it is equipped with what is known as a Cardan joint containing two axes at right angles. The preferred form and construction is one in which a block $E^3$ (Figs. 9, 10 and 11) is pivotally connected to the frame on a horizontal axis $E^4$, and to the head E on an axis $E^2$ perpendicular to and intersecting axis $E^4$. The head E is formed or provided with a jaw portion $E^1$ carrying adjustable center or pivot screws $e$ each engaging a bearing or seat in a hardened stud or block $e^1$ fitted to a socket in the block $E^3$, the two studs being located on diametrically opposite sides of the block, and each provided with a dust ring movably applied thereto for contacting with the faces of jam nuts $e^3$ applied to the screws $e$. The horizontal pivotal connection between block $E^3$ and the frame differs slightly from the vertical connection between the block and head in this that the inserted stud $e$ on the side next the lap A is provided with a reduced cylindrical extension or journal $e^4$ which is received in a sleeve $e^5$ removably fitted to its lugs $D^1$, the inner end of said sleeve being engaged by the outer end of stud $e$, the object being to minimize wear on this side and thereby preserve the tool carrying head in proper relation to the lapping surface. Projecting from the rear of the jaw portion $E^1$ is an operating and controlling lever $E^5$ which engages a templet or guide F also secured to the base or frame D of the machine.

Mounted rotatably within the head is a tool carrier $E^6$ (Figs. 10 and 11) and a tool G is indicated therein. This carrier may be of any approved construction adapted to grasp and hold the tool firmly and in the illustration what is known as a jeweler's split chuck is shown, equipped with a screw $e^6$ for engaging a flat on the tool, and an adjustable gage $e^7$, to assist in properly locating the master tool when adjusting the machine as will presently appear. The carrier also has secured to it an index or capstan $E^7$ and a catch $E^8$ is provided whereby the capstan may be rigidly held in any one of four positions. The capstan has four radial arms and in each arm is a recess $E^9$ with which the pivoted catch $E^8$ may be brought into engagement. Any convenient device may be provided for locking or retaining the catch in position when engaged with the capstan arms.

Figure 1:
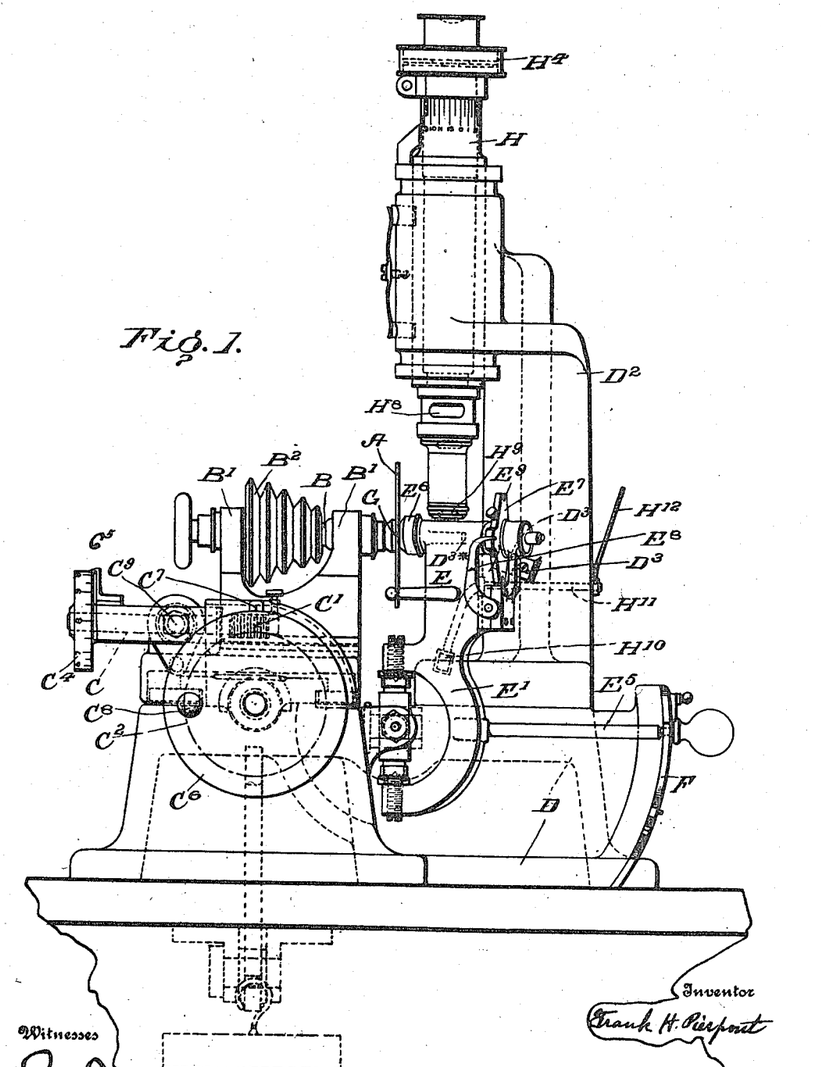
Figure 1 is a front elevation of the machine.
Figure 2:
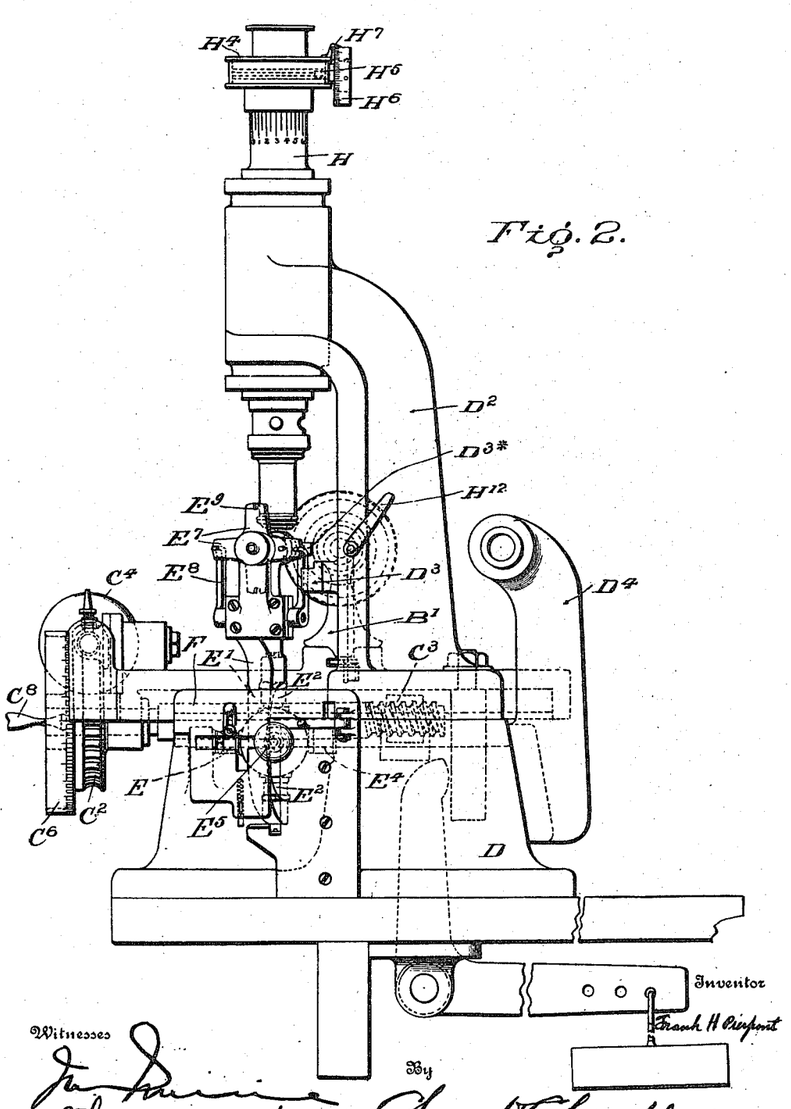
Fig. 2 is a side elevation of the same viewed from the right of Fig. 1.
Figure 4:
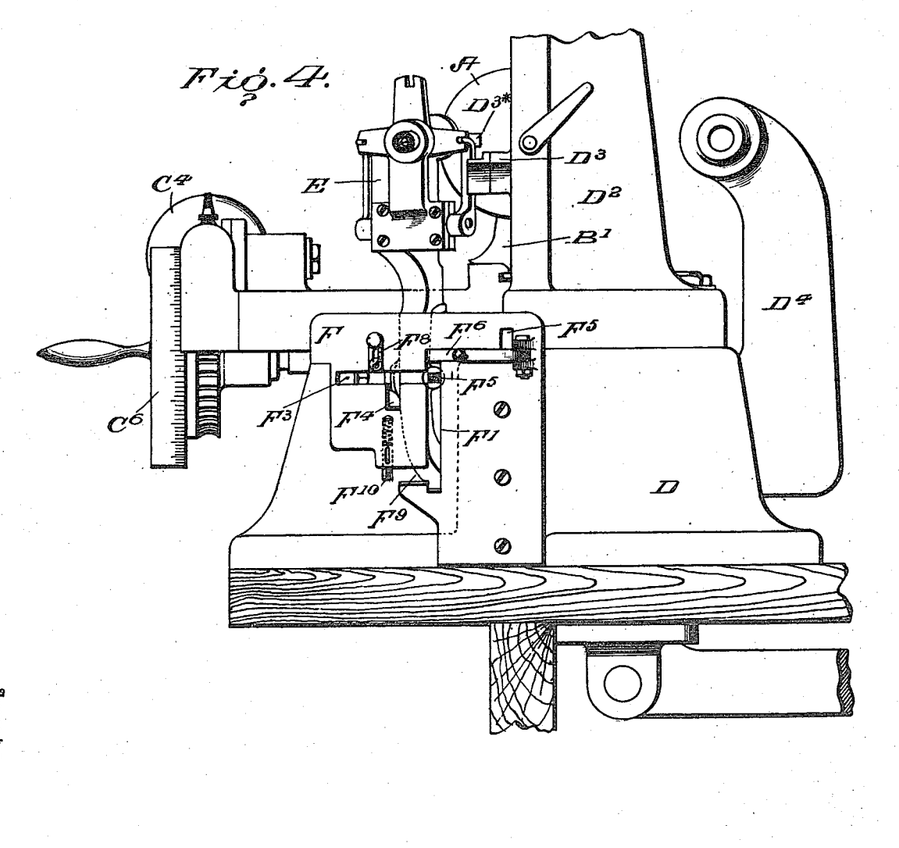
Fig. 4 is the same view as Fig. 2 but with the dotted work omitted for the sake of clearness; the upper portion of the machine is also omitted, Figs. 5 to 8 inclusive are front elevations of the templet or guiding and directing means for controlling the movements of the tool holder, the parts being shown in different positions of adjustment.
Figure 5:
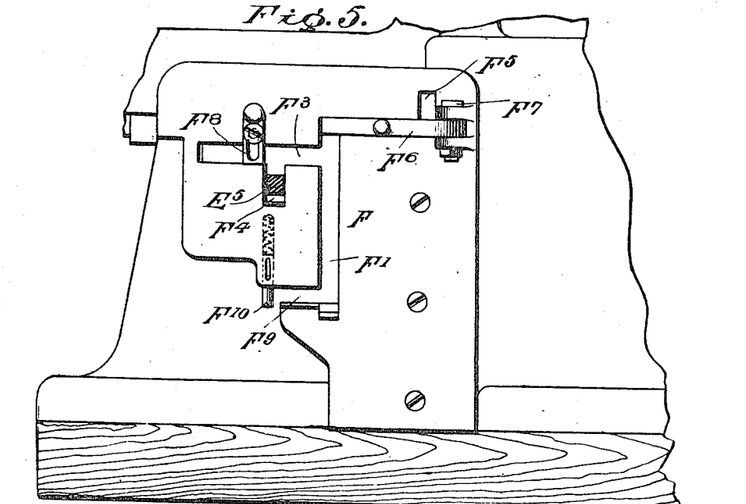
Figure 16:
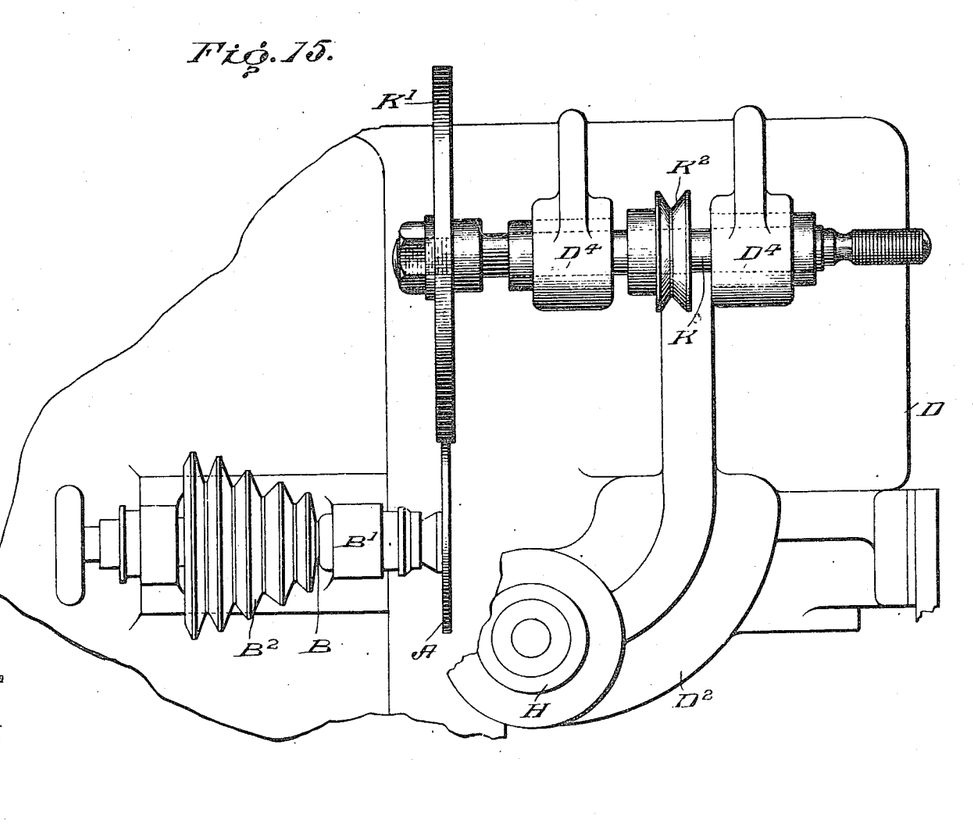
Fig. 16 is a front elevation of the machine with the cutter-carrying head swung out of the operative position, Fig. 16$^A$ is an elevation of an accessory for use with this machine.

Supported by a bracket $D^2$ from the frame D of the machine is a microscope H, Figs. 1, 2, 3 and 16. The microscope and lap A are in such relative position that the tool-carrying head E when swung about the horizontal axis $E^4$ of the Cardan joint may cause the tool G to be brought either against the lap, for grinding, or beneath the object-glass of the microscope, for the purpose of gaging. On the bracket $D^2$ carrying the microscope is a stop $D^3$ (Figs. 1, 4 and 16). When the tool is to be viewed beneath the microscope the head E is brought back until the lug $D^{3*}$ thereon rests against this stop and as the head is constrained in its movement about a horizontal axis by the pivots $E^4$ of the Cardan joint and limited in its rearward movement by the stop, it is only necessary to restrain it from turning about the pivots $E^2$ of the Cardan joint, to insure that the tool shall always be brought to a predetermined, invariable and final position beneath the microscope; this turning of the head is prevented by the operating arm or lever $E^5$ engaging the templet F as hereinafter described.

Figures 13, 17, 18, 19, 20, 21:
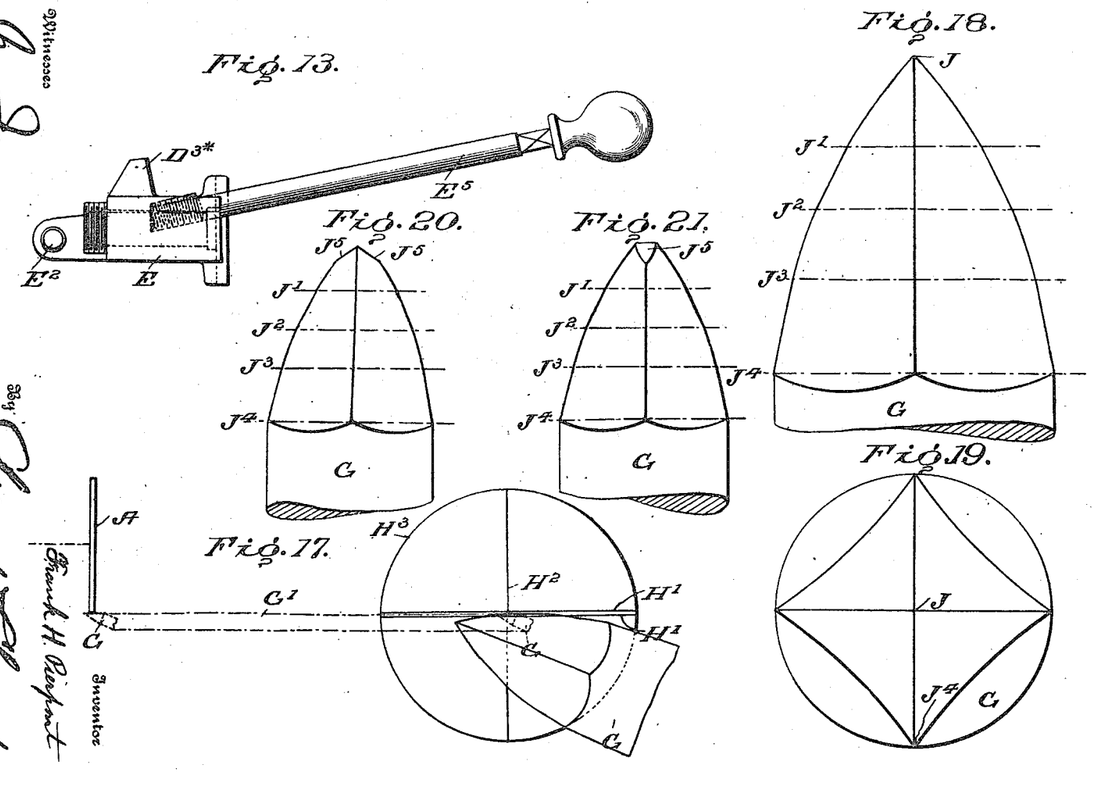
Fig. 17 is a diagrammatic view showing the method of gaging the tool under the microscope.
Fig. 18 is a side elevation on a greatly enlarged scale of a cutter shaped according to this invention.
Fig. 19 is an end elevation of the same looking toward the point of the cutter.
Fig. 20 is an elevation of another form of cutter shaped according to this invention.
Fig. 21 is a side elevation of the same cutter viewed from the right of Fig. 20.

Within the microscope two parallel gage lines $H^1$ (Fig. 17) and a cross line $H^2$ are provided. In Fig. 17 the field of the microscope is indicated at $H^3$ and the lines $H^1$ cross it in the direction of movement of the cutter as it is carried from the lap A to the gaging position beneath the microscope. The tool is shown in dotted position before the lap and in full lines in the field of the microscope, the path of travel being indicated by chain lines $G^1$. The glass which carries the gage lines is mounted in a frame $H^4$ (Fig. 2) beneath the eye-piece and may be adjusted relatively to the optical axis of the instrument by a screw-threaded spindle $H^5$ carrying an index wheel $H^6$ which coöperates with a stationary index $H^7$.

The method employed for gaging the tool is as follows: A master tool is first placed in the carrier and the holder brought back to the gaging position with lug $D^{3*}$ engaging stop $D^3$. The gage glass is then moved until the cutting edge of the tool lies between the lines $H^1$. When in this position the cross line $H^2$ may be adapted to cut across any convenient part of the tool for the purpose of checking the accuracy of the gaging position as limited by the stop $D^3$, but this line may be dispensed with if desired. The master tool is then removed from the carrier, the adjustment of the gage being maintained constant, and the tool to be ground is mounted in the carrier. To facilitate the lapping operation the blanks may be preliminarily pointed but at an angle exceeding any found in the finished cutter as produced. The head E is now advanced to the lap and grinding effected as hereinafter described. After such grinding the head is brought back again to the gaging position and if the machine is properly performing its work, the cutting edge of the tool corresponding to the gaged edge of the master tool will lie precisely between the lines $H^1$ when the cutter is viewed through the microscope. As the lap wears the tool which is guided in a predetermined path will obviously be left too large so that the cutting edge will not appear between the lines $H^1$. To compensate therefor the lap is advanced by means of the worm spindle C until the tool is brought to the correct gage.

It is necessary that the illumination of the tool while beneath the microscope shall be such that the cutting edge of the tool may be clearly defined. For this purpose light is admitted through an aperture $H^8$ (Fig. 1) above the object-glass indicated at $H^9$ and deflected by any suitable device along the optical axis and through the object-glass on to the cutter. Beneath the object is a mirror H¹⁰ carried by a rocking arm H¹¹ controlled by a lever H¹². When the lever H¹² is depressed the mirror is raised into such position that it reflects light from behind the cutter toward the object-glass. Both of these means for illuminating the object are known, but they have not heretofore been used simultaneously. By using them simultaneously the cutting edge of the tool is sharply defined in the field of the microscope and can be precisely gaged between the gage lines H¹ as described.

Figure 6:
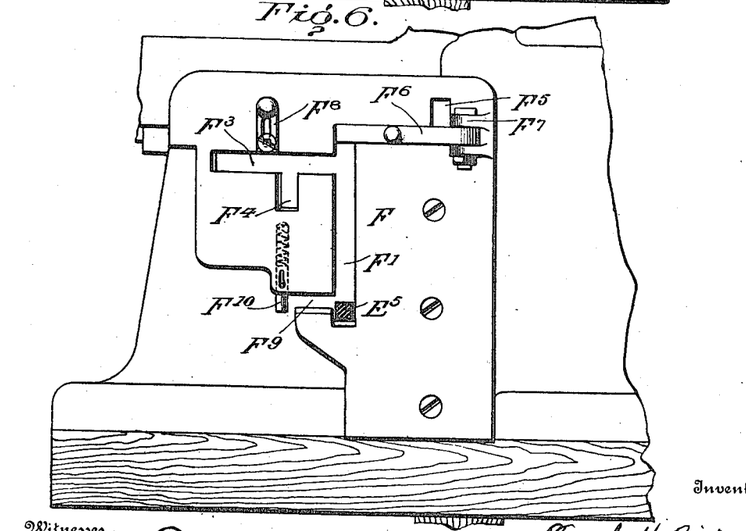
Figure 7:
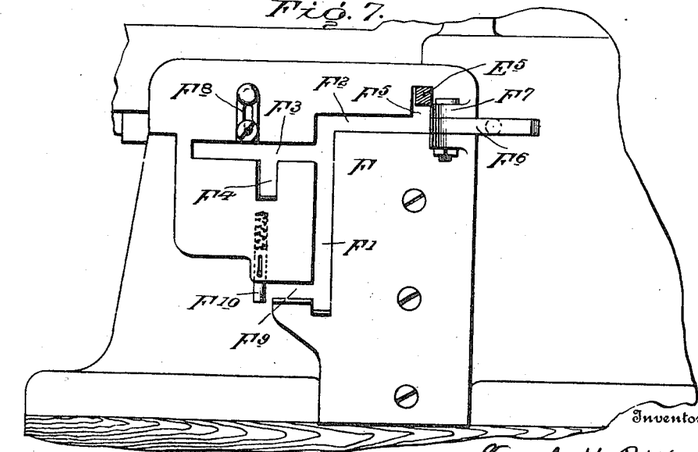
Figure 8:
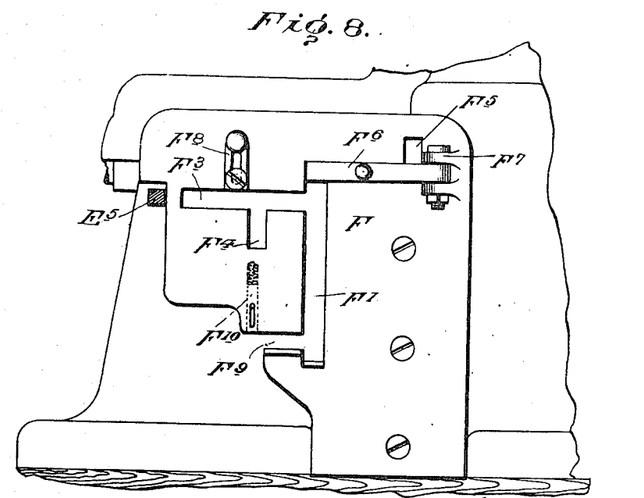

The precise shape of the cutter is obtained by moving the operating arm E⁵ in the templet F. The templet has a vertical slot or guide-way F¹ (Figs. 4 to 8) from the upper end of which extends a horizontal slot or guide-way F² (Fig. 7) and at the lower point and on the opposite side of the way F¹ is a second horizontal way F³. In the way F³ and at a point nearer the way F¹ than the opposite extremity of the way F³ is a depression or recess F⁴ constituting a second short vertical way. At the extreme end of the way F² is also a short upwardly directed way F⁵. Normally the way F² is closed by a gate F⁶ hinged at F⁷ to the guide. A sliding gate F⁸ also extends across the horizontal way F³ and constitutes a stop whereby the arm E⁵ when traversing the way F³ may be automatically brought into position to drop into the recess F⁴. The arm E⁵ enters the way F¹ by a slot F⁹ and is prevented from leaving the same by a spring-controlled pin F¹⁰. When the arm is in the way F¹ it maintains the head E in an oblique position relatively to the longitudinal axis of the mandrel B and prevents any turning movement of the head about the pivots E² of the Cardan joint. When the head is brought back against the stop D³ the arm E⁵ is practically at the base of the vertical way F¹ as shown in Fig. 6, but as it is raised in the way, the head is advanced in a plane parallel with the axis of the mandrel B so that the cutter is advanced from under the microscope to the lap A. As the head continues its forward movement the cutter is moved across the edge of the lap whereby that face of the tool toward the lap is ground. The edges formed on the tool by this means incline toward the axis of the cutter at a given angle. The holder may then be brought back to the position of rest and the capstan turned so that the next pair of arms is brought into engagement with the locking device E⁸ and the tool is then again advanced and a second face ground thereon. This process may be repeated until a pointed angular pyramid is formed, the faces of which are slightly hollowed by their contact with the curved face of the lap. A portion of each face is now rounded or curved in toward the point of the cutter. This is effected by raising the operating lever E⁵ to the level of and then carrying it laterally along the horizontal way F³ of the templet. For this purpose the stop F⁸ is raised so that the operating handle may traverse the whole length of the way. As the operating handle is moved along the way F³ the head E turns about the vertical axis E² of the Cardan joint and the tool being in contact with the face of the lap will be correspondingly rounded. Each face of the tool is treated in this manner. The next step in the process consists in flattening a portion of the curved part of each face. This is effected by moving the operating lever E⁵ down into the way F⁴ and after the lap has been adjusted by advancing it a sufficient distance toward the tool to give the required depth of cut raising the operating lever to the level of way F³. The stop F⁸ is lowered for this purpose so that the operating lever may be readily brought into position opposite the way F⁴ and then dropped into this recess preliminary to the adjustment of the lap, when by raising the lever E⁵ the same movement is given to the head as is obtained by moving the lever in the vertical way F¹, but with the tool in a different angular relation so that a small portion only of the tool situated between the ends of the curved part of each face is brought against the lap.

When it is desired to produce a cutter with parallel edges the gate F⁶ is opened and the operating lever carried along the transverse way F² to the vertical way F⁵ at the end thereof. This brings the head into such position that the longitudinal axis of the cutter lies parallel with that of the mandrel B so that if the operating lever is now raised in the guide F⁵ the tool will be carried across the face of the lap in this position and the desired shape will thus be obtained.

The form of cutter found most efficient for shaping the matrix punches is shown on an enlarged scale in Figs. 18 and 19. It will be seen that it comprises a pointed angular pyramid whereon the intersection of adjacent faces affords an edge which is first a curve from the point along a convex tip such curved portion being shown as extending from J to J¹; then a straight incline at a given angle with the axis which extends from J¹ to J² and next a second curve from J² to J³ and finally a tangent to the second curve slanting outward to the base at an angle less than that at which the straight portion J¹ J² is set to the axis and extending from J³ to J⁴ in the figure. The straight portion J³ to J⁴ is formed by the movement of the operating lever in the way F¹. The curved portions J² to J³ and J to J¹ are produced by movement of the operating lever through the transverse way F³ and the straight portion J¹ to J² is obtained by movement of the lever in the vertical recess F⁴.

It is sometimes found convenient to provide this tool with a chisel edge as indicated in Figs. 20 and 21 instead of the point shown in Figs. 18 and 19. When this is the case the spring-controlled pin $F^{10}$ is raised so that the operating lever can pass out from the guide plate into the position shown in Fig. 8. As it reaches the upper end of this vertical exterior guide, the point of the tool is brought against the lap so that one angle is flattened as shown at $J^5$. The tool is then turned through an angle of 180° in the carrier and again brought against the lap whereby the opposite angle is similarly flattened.

For operating the catch $E^8$ (Figs. 10 to 14) a cam lever $E^{10}$ is conveniently employed. The lever is pivoted in the head E and the cam $E^{11}$ bears against the spring-controlled arm $E^{12}$ secured to a rock shaft $E^{13}$ which carries the two arms of the catch. When the lever is in the position shown in Fig. 10, the cam is turned so that it depresses the arm $E^{12}$, against the action of its spring $E^{14}$, whereby the shaft $E^{13}$ is rocked and the arms $E^8$ of the catch withdrawn from the recesses $E^9$ in the capstan arms, but when the cam lever is turned in the position shown in Fig. 11, the flat portion of the cam $E^{11}$ is turned around toward the arm $E^{12}$ so that this is lifted by its spring $E^{14}$ and the catch engages the capstan arms.

The lap A is preferably of metal charged with diamond dust and an attachment is provided for recharging it when required. At the rear of the machine, brackets $D^4$ (Fig. 15) are provided to receive a spindle K carrying a disk $K^1$. The diamond dust mixed with oil is made to adhere to the edge of the disk $K^1$ and the mandrel head $B^1$ is then advanced toward it so that the lap is brought into contact with the disk. The spindle K carries a pulley $K^2$ whereby it may be rotated. As the charging disk $K^1$ rotates it carries around with it the lap A and embeds the diamond dust in the same.

Figures 16, 16A:
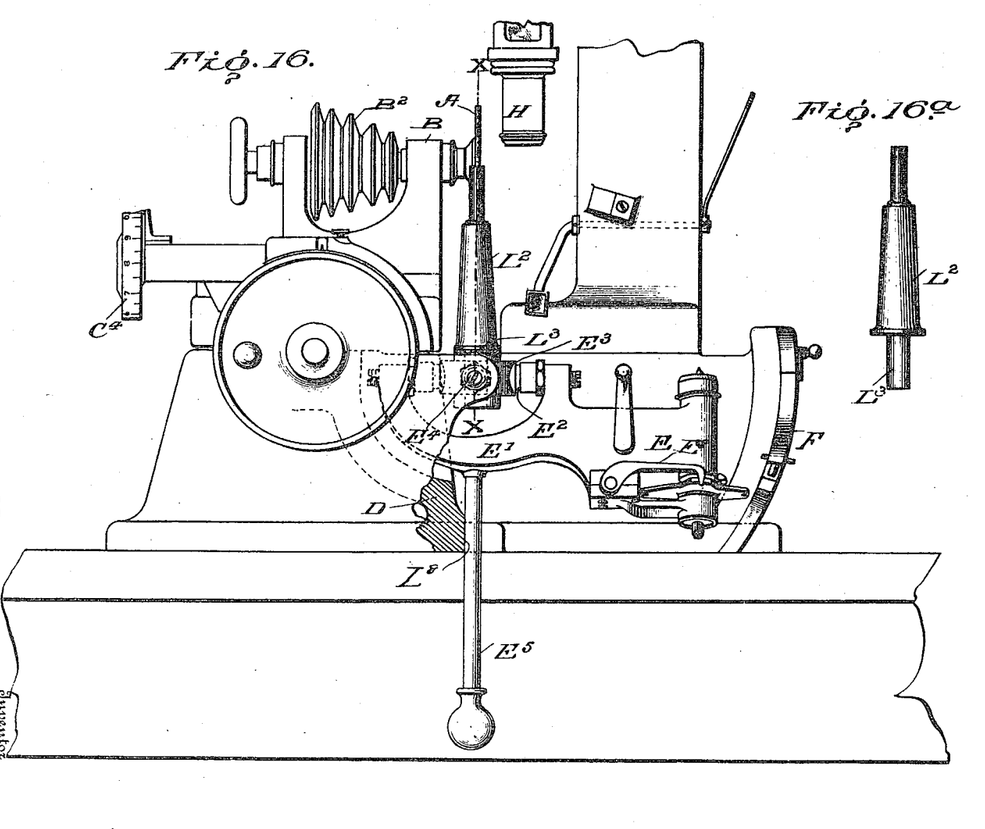

For accurately positioning the lap relatively to the cutter holder E a socket L (Fig. 11) normally closed by a plug $L^1$ is provided in the block $E^3$ constituting the central member of the Cardan joint. When it is desired to adjust the lap the plug $L^1$ is withdrawn and the reduced end $L^3$ (Figs. 16 and 16$^A$) of a positioning pin $L^2$ is entered in the socket. The operating arm $E^5$ of the head E is then carried out of the guide plate and brought into a vertical position against a stop $L^4$ (Fig. 16) on the frame of the machine. By this movement the head E is swung about the horizontal pivots $E^4$ of the Cardan joint so that it assumes an approximately horizontal position while the pin $L^2$ is vertical. The lap is then advanced until it just touches the pin $L^2$ and as soon as it touches the pin (which may be detected by a microphone) it is withdrawn a known distance by rotating the graduated operating screw C $C^4$ a given amount. Conveniently the lap is so disposed relatively to the pin $L^2$ that a vertical plane passing through the center of the grinding surface of the lap will also pass through the central vertical axis of the pin as indicated by the chain line X—X, but this is not essential.

It will be understood that the templet F may be constructed with various guideways according to the shape of tool required but that in all cases a guide of some form is provided whereby the tool may be brought direct from the lap to a predetermined and invariable position beneath the microscope for the purpose of gaging the tool.

Having thus described my said invention, what I claim as new and desire to secure by Letters Patent, is:

1. In a cutter-grinding machine the combination with a cutter-carrying head supported from the frame by a Cardan joint, of a templet or guide engaging the head to control and limit its movement about that joint.

2. In a cutter shaping machine the combination of the following elements, to wit; a rotary grinding or lapping member; a cutter carrier pivotally supported to oscillate freely in transverse direction about intersecting axes; an operating or controlling member connected with said carrier for oscillating the latter about said axes; and means for positively guiding and directing the movements of said operating or controlling member.

3. In a cutter shaping machine the combination of the following elements, to wit; a rotary grinding or lapping member; a cutter carrier mounted to oscillate about transverse axes and provided with a tool holder and a guiding member; and means for positively directing said guiding member.

4. In a cutter shaping machine the combination of the following elements, to wit; a rotary grinding or lapping member; a tool carrier mounted to oscillate in transverse planes and provided with a tool holder and a guiding or directing member; and means engaged by said guiding or directing member for positively determining the direction of movement of said carrier in transverse directions.

5. In a cutter shaping machine the combination of the following elements, to wit, a rotary grinding member; a tool carrier mounted to oscillate in intersecting planes and provided with a revoluble tool holder and a controlling member; and means operating upon said controlling member for determining the movements of the tool carrier and the path of the tool while in contact with the grinding surface.

6. In a cutter shaping machine the combination of the following elements, to wit; a revoluble tool holder provided with an index; a carrier therefor pivotally supported to oscillate upon axes disposed at right angles; an operating member coupled with said carrier; and means for guiding said operating member in parallel planes perpendicular to one axis of oscillation.

7. In a cutter shaping machine, the combination of the following elements, to wit; a tool holder; a carrier therefor pivoted to oscillate about transverse axes; a guiding member coupled with said carrier; and a means engaging said guiding member to determine positively the path traversed by said tool holder.

8. In a cutter shaping machine, the combination of the following elements, to wit; a lapping member; a carrier provided with a cutter holder and supported to oscillate about transverse axes; a controlling member coupled with said carrier; and a templet or guide for said controlling member.

9. In a cutter shaping machine the combination of the following elements, to wit; a lapping member; a carrier mounted to oscillate on transverse axes and provided with a cutter holder; a controlling member coupled with said carrier; and a templet engaging said controlling member to direct the path of the carrier and its holder, said templet provided with a plurality of parallel guides and a transverse guide communicating therewith.

10. In a cutter shaping machine, provided with a lapping member, a tool holder mounted upon a carrier supported to oscillate in transverse planes, and a controlling member coupled with said carrier to direct its movement, and in combination therewith, a templet engaging said controlling member provided with a plurality of guides in parallel relation and a transverse guide communicating with said first named guides.

11. In a cutter shaping machine provided with a lapping member, oscillating tool holder and controlling member for the latter and in combination therewith a templet or guide for said controlling member provided with a plurality of guides or ways and movable gates or stops.

12. In a cutter shaping machine, the combination with a rotary lapping or grinding member, of a cutter-carrier supported to freely oscillate about transverse axes and an actuating means coupled with said carrier for effecting its movement about either axis.

13. In a cutter shaping machine the combination of the following elements, to wit; a rotary grinding or lapping member; a revoluble tool holder provided with an index; a carrier for said holder mounted to reciprocate in either of two relatively transverse planes; means coupled with said carrier for moving the latter in either of said directions; and a templet restraining the motion of the carrier in either direction while permitting such motion in the other direction.

FRANK HINMAN PIERPONT.

Witnesses:
H. D. JAMESON,
F. L. RAND.